Jan. 20, 1970　　　　　　　E. MENZI　　　　　3,490,629
EXCAVATOR
Filed Dec. 12, 1967　　　　　　　　　　　　　6 Sheets-Sheet 4

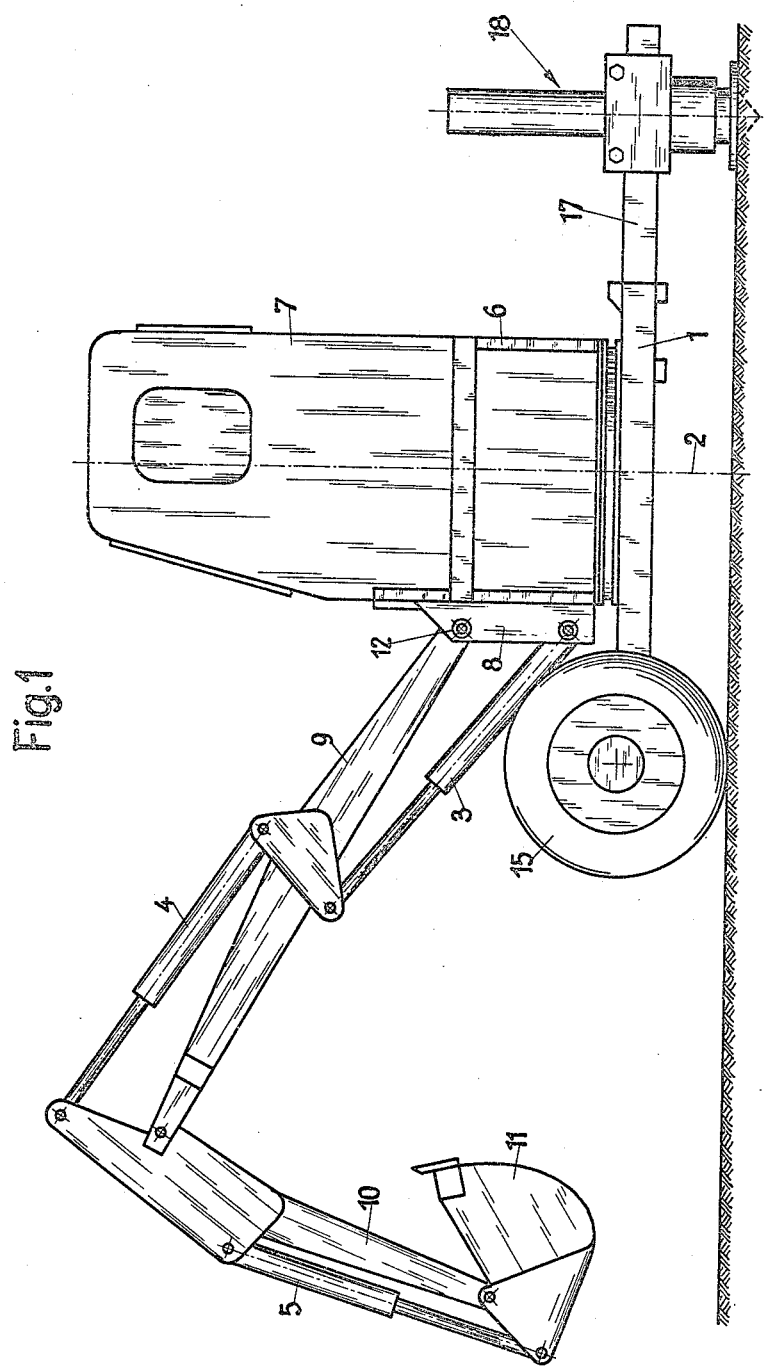

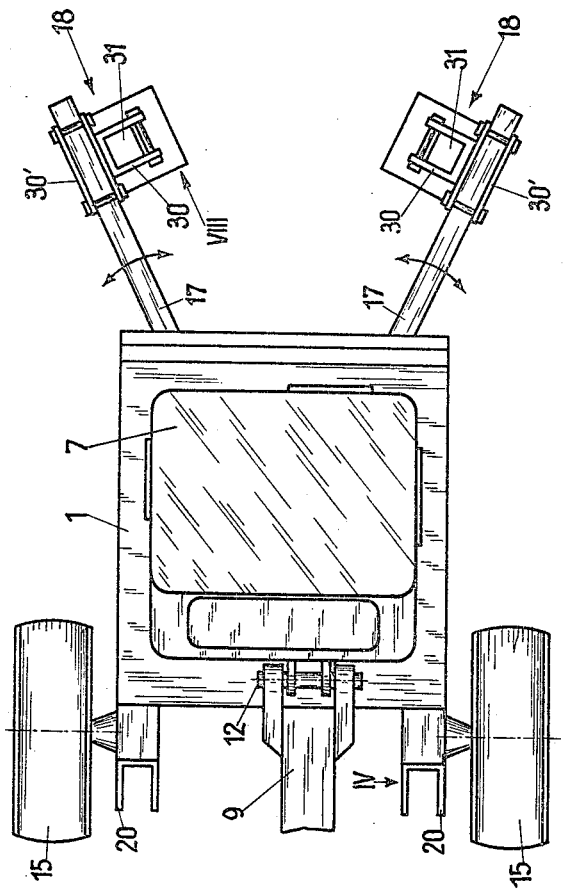

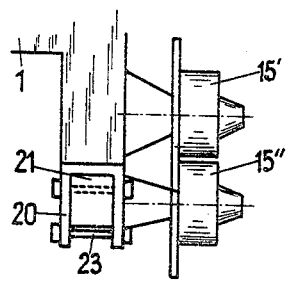
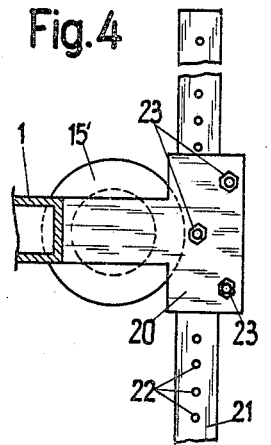
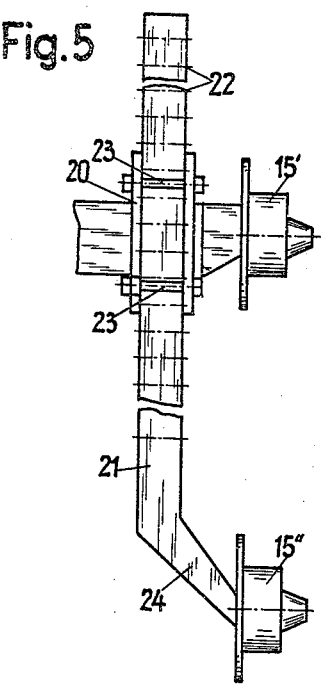
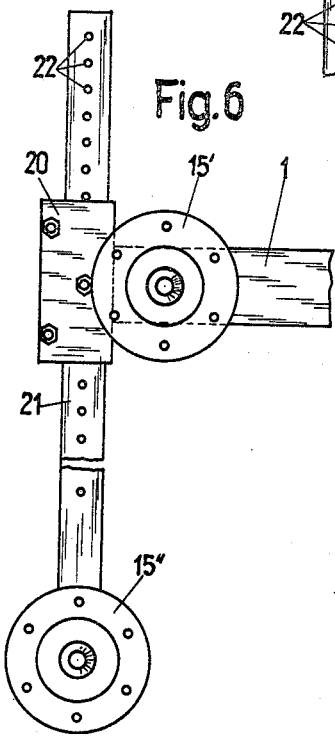

INVENTOR.
Ernst Menzi
BY Kenyon, Palmer,
Stewart & Estabrook

Jan. 20, 1970  E. MENZI  3,490,629
EXCAVATOR

Filed Dec. 12, 1967  6 Sheets-Sheet 5

INVENTOR.
Ernst Menzi
BY Kenyon, Palmer,
Stewart & Estabrook

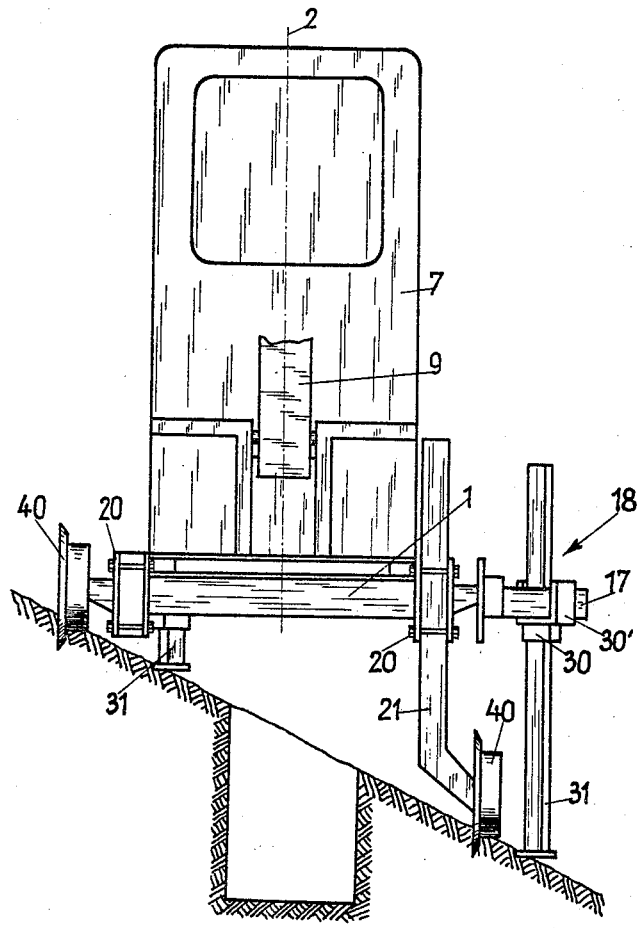

United States Patent Office 3,490,629
Patented Jan. 20, 1970

3,490,629
EXCAVATOR
Ernst Menzi, Landernaach 6443,
Widnau, Switzerland
Filed Dec. 12, 1967, Ser. No. 689,901
Claims priority, application Austria, Dec. 27, 1966,
11,868/66
Int. Cl. E02f 3/28; B62d 37/00
U.S. Cl. 214—138          7 Claims

ABSTRACT OF THE DISCLOSURE

Excavators capable of self-ambulation even over highly sloped or marshy or other difficult terrain and of excavation operation even on steep slopes having a frame carrying a platform rotatable about a vertical axis, a driving unit, and articulated jib carried by the platform are characterized by at least one pair of non-driven wheel hubs mounted at one end of the frame individually adjustable as to height with relation to the plane of the frame and a pair of foot supports similarly mounted at the other end of the frame.

---

The invention relates to an excavator with a frame carrying a platform rotatable about a vertical axis with driving unit and operating seat as well as struts for the articulated bearing of the jib, wherein the frame has on one side at least one pair of non-driven wheel hubs and foot supports on the other side.

Excavators of this kind are known. Within the framework of trench work to be carried out with such excavators the need often arises to work perpendicularly to the course of the line of dip of a declivity, a slope, a bank or the like, but in such cases the possible setting of the excavator is limited due to the inclination of the ground.

It is an object of the invention so to construct an excavator that it can be set up independently of the steepness of the ground, this being attained in that foot supports and at least partially the wheel hubs are mounted individually adjustable as to height in relation to the plane formed by the frame. As a result of the proposal in accordance with the invention the wheels and supports of the excavator are so adjusted relative to the frame, that the frame independently of the inclination or steepness of the ground preserves at least an approximately horizontal position.

In order to illustrate the invention one embodiment is explained in greater detail below without, however, the invention being limited directly to this embodiment.

An embodiment of the invention is illustrated in the accompanying drawings in which:

FIGURE 1 is a side elevational view of an excavator constructed in accordance with the invention.

FIGURE 2 is a top plan view, partially broken away, of the excavator of FIG. 1.

FIGURE 3 is a fragmentary plan view of a wheel hub portion of the excavator.

FIGURE 4 is a fragmentary inner side view, partially in section, of the wheel hub portion shown in FIG. 3.

FIGURE 5 is a fragmentary front view of the wheel hub portion shown in FIGURE 3.

FIGURE 6 is a fragmentary outer side view of the wheel hub portion shown in FIG. 3.

FIGURE 13 is an end view of the excavator as positioned upon a steep slope for excavation operation.

Figure 7:
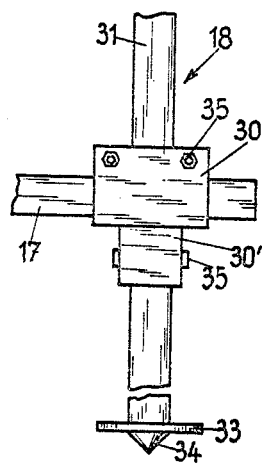
FIGURE 7 is a fragmentary outer side view of an adjustable height foot support portion of the excavator.
Figure 8:
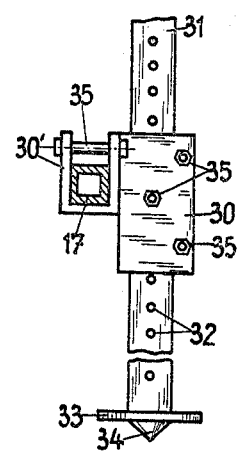
FIGURE 8 is a fragmentary inner end view, partially in section, of the foot support portion of FIG. 7.
Figure 9:
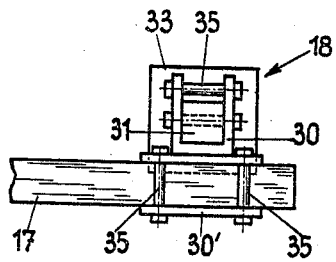
FIGURE 9 is a fragmentary top plan view of the foot support portion of FIG. 7.

The excavator has a chassis frame 1 with a rotatable platform 6, which carries the motor unit for development of the pressure for the hyrdaulic equipment, which actuates the lifting cylinders, 3, 4 and 5. Platform 6 is rotatable about the vertical axis 2 and supports above the motor unit the cabin 7 for the operator. Support 8 is also connected to the platform 6, on which support the jib 9 is pivotable about the horizontal axis 12. The second jib arm 10 has at its free end the excavator scoop 11. The jib is pivoted in known manner by means of control members in the cabin.

The chassis 1 (frame) is supported on the one side by a pair of wheels 15 and on the other side by jibs 17 with vertically adjustable foot supports 18. The wheels 15 do not have any drive. For transport over a large distance, the jibs 17 are swung together and connected by a suitable coupling member with a towing vehicle.

The excavator can be moved step-wise over shorter distances with the assistance of the scoop 11 and the jibs. For this purpose the platform 6 is turned through 180° in relation to the position indicated in FIGURE 1. By actuating the hydraulic ram units 3 to 5, first of all the jib arm 9 and the arm portion 10 are brought to an approximately right angular position and the scoop settled on the ground. By further actuation of the double-acting ram unit 3, the frame 1 together with the support 18 is then raised on one side and thereafter by actuation of the ram unit 4 the excavator drawn along by rolling on its wheels 15, wherein the scoop remains essentially at its firmly anchored place on the ground. In this manner excavation work succeeds even in marshy ground, which could not be done with other excavator vehicles. By this construction it is also further made possible that the operator does not have to leave the cabin for further movement of the excavator.

It is essential and important that the foot supports 18 and at least partially the wheel hubs are mounted individually adjustable as to height in relation to the plane formed through the frame 1. For this purpose, there are provided in the region of the hubs 15' carrying pneumatic wheels 15 fixedly mounted on the frame 1 guide members formed as clamping jaws, which in the present case are constructed as U-profiles 20. These profiles 20 are welded to the frame 1. These profiles 20 house rod-like rails 21, which are preferably constructed as box-like profiles. These rails have bores 22 uniformly spaced apart along their length. These bores receive bolts 23 with the help of which the rails 21 are positively and tensionally braced in the U-profile 20. The wheel hub 15'' is secured on the rail 21 by means of a lateral bend 24.

The foot supports 18 are likewise adjustable as to height on the pivotal jibs 17. They consist of a rail 31 which is perforated by a plurality of bores 32 arranged with equal spacings. A support plate 33 as well as a spike 34 on its underside form the lower end. Two U-profiles 30 and 30' are used for fixing the rail 31 on the jib 17, the axes of the respective profiles being disposed perpendicular to one another. One profile 30' is positively and tensionally braced with the jib 17 and the other profile 30 with the rail 31. Bolts 35 provide secure connection.

Figure 11:
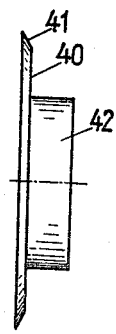
FIGURE 11 is an end view of a wheel used with the excavator for steep slopes.
Figure 12:
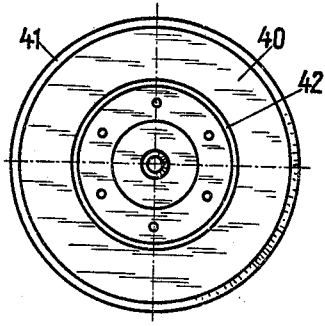
FIGURE 12 is a plan view of the wheel shown in FIG. 11.

FIGURES 11 and 12 show the wheel which is used in the operation of the excavator at a steep slope. It consists of a flat circular disc, the edge zone 41 of which is preferably conically shaped, with a concentric hollow cylindrical part 42. This disc wheel is connected in known manner with the hub 15' or 15''.

If the excavator according to FIGURE 1 is to be set up at a steep slope then it is first of all brought to the setting position of its immediate neighbourhood. The jib 9, 10 is turned through 90° in relation to the position shown in FIGURE 1, set up on the ground and loaded until the chassis frame 1 lifts on one side. The pneumatic wheel 15 on the lifted side is now removed and the rail 21 with a disc wheel 40 inserted in the U-profile and securely clamped. The foot support 18 is likewise fixed to the corresponding height position. The jib or the hydraulic unit which turns it is now unloaded and the foot support and the disc wheel settled on the ground. The jib is pivoted through 180° and the process already described commenced once again. On the now lifted other side of the chassis frame 1, the pneumatic wheel is likewise removed and at this position a disc wheel inserted on the hub 15'.

The excavator is now ready for operation (FIGURE 13). If in the work to be carried out by the excavator a ground zone with strongly alternating inclination has to be travelled over, then adaptation to the appropriate inclination can take place through a simple adjustment of the foot supports 18 and the rails 21. It is essential and important that the disc wheels 40 are equally arranged so that in both wheels the hollow cylindrical portion 42 lies on the valley side. Due to the disc wheels 40 or the knife-like edge zones 41 the wheel penetrates into the ground, and at the same time the cylindrical portion resting on the ground effects a compression and thereby compactness of the ground, so that the excavator thus obtains a secure hold even on steep slopes. According to the type of the ground properties the disc wheels can obviously be selected with differing diameter ratios (disc/cylinder part).

The illustrated and described embodiment for the guide members or the rails held by them are not compulsory for the invention but it is obviously possible in place of the unilaterally open U-profile to use peripherally closed loaded profiles or even profiles with circular cross-section or the like. Similar considerations apply to the rails themselves.

Thus, at the steep slope the excavator moves forward of itself step-wise in the already above described manner. It is clear that due to the proposal in accordance with the invention to arrange the foot supports 18 and at least partially the wheel hubs 15" individually adjustable as to height in relation to the plane formed through the frame 1, there is given the possibility of setting up the excavator even at extremely steep slopes, whereby a preceptible deficiency up to now can be removed by relatively simple means. It must also be mentioned that the rails 21 which carry the wheel hubs 15" can be inserted in the U-profile holder 20 in a position turned through 180° from that shown in FIGURES 5 and 13, so that in this simple manner without additional excess expenditure the track width of the excavator can be altered.

Figure 10:
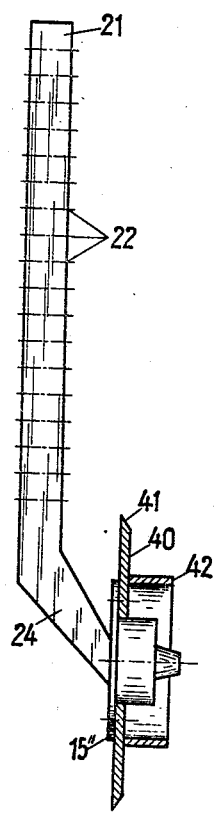
FIGURE 10 is an end view, partially in section, of the wheel hub support from FIG. 5.

The hubs 15' and 15" may both be used for securing the wheels 15 or 40. However, the hubs 15' are primarily used for mounting the pneumatic tired wheels 15 for trailering or other transport of the excavator on flat or nearly flat terrain. When so used, the hubs 15", supports 21 and related items may be removed from the frame as shown in FIG. 1 and are carried or stored in some convenient manner. The hubs 15" are principally used for mounting of the special wheels 40 as shown in FIGS. 10 and 13. In the event that one of the wheels 40 should be required to be raised so high at one side of the frame as to cause interference of 15' with hub 15", then the support 21 and hub 15" on that side of the frame may be removed and the wheel 40 mounted on the hub 15' while the opposite wheel 40 is mounted on the supported, lowered hub 15" (see FIG. 13).

In FIGURES 2 and 13, both jibs 17 are illustrated with the supports 18. Obviously, it lies within the framework of the invention in operations with the excavator at inclined slopes to arrange these supports 18 only for jibs 17 on the valley side. For smaller slope inclinations up to about 25%, a smaller guide wheel similar to the disc wheel 40 is mounted towards the hillside. The pneumatic wheel remains on the valley side. Good working is obtained with this arrangement.

I claim:
1. In an excavator comprising a frame, a platform mounted upon said frame for rotation about an axis perpendicular to the plane of said frame and an articulated jib carried by said platform, the improvement which comprises at least one pair of non-driven wheel hubs at one end of said frame and a pair of foot supports at the other end of said frame, said wheel hubs and said foot supports being carried by said frame adjustable as to height relative to said plane by mounting devices which comprise guide members of U-shaped profile fixed to said frame forming clamping jaws, elongated support rails clamped in said guide members so the longitudinal axes of said rails extend perpendicularly to said plane, and means to permit said support rails to be so clamped at various positions along their longitudinal axis to permit adjustment of the position of said wheel hubs and foot supports relative to said frame.

2. An excavator as claimed in claim 1 wherein said means comprise bolts and bores through said guide members to receive said bolts.

3. An excavator as claimed in claim 1 wherein said guide members are welded to said frame.

4. An excavator as claimed in claim 1 wherein the support rails for said wheel hubs include a laterally projecting bend whereby the rails may be turned through 180° to alter the width of the track of wheels mounted upon said wheel hubs.

5. An excavator as claimed in claim 1 wherein said foot supports are provided with spikes at their lower ends.

6. An excavator as claimed in claim 1 wherein each said wheel hub has mounted thereon a wheel which comprises a circular disc and a cylindrical part concentric with said disc extending perpendicularly from one face of the disc, the diameter of the cylindrical part being smaller than the diameter of said disc.

7. An excavator as claimed in claim 1 wherein the guide members by which said foot supports are carried are connected to said frame by jibs mounted upon said frame for pivotal movement parallel to said plane of the frame.

References Cited

UNITED STATES PATENTS

| 696,535 | 4/1902 | Bailey. |
| 3,079,009 | 2/1963 | Davis _____ 214—138 X |
| 3,184,867 | 5/1965 | Symmank _____ 37—103 |

FOREIGN PATENTS

| 1,103,692 | 5/1955 | France. |

HUGO O. SCHULTZ, Primary Examiner

U.S. Cl. X.R.

280—6